3,705,873
POLY-GAMMA-SUBSTITUTED GLUTAMATE
SOLUTIONS CONTAINING ALCOHOLS
Yasuo Fujimoto, Yokohama, Masayuki Teranishi, Tokyo, and Toshihiko Tezuka, Yokohama, Japan, assignors to Kyowa Hakko Kogyo Co., Ltd., Tokyo, Japan
No Drawing. Filed Apr. 30, 1971, Ser. No. 139,199
Claims priority, application Japan, May 11, 1970, 45/39,355
Int. Cl. C08g 51/34, 51/30
U.S. Cl. 260—33.4 R    18 Claims

ABSTRACT OF THE DISCLOSURE

Poly-γ-substituted glutamate solutions comprising the polymerization product of a N-carboxy anhydride of a γ-substituted glutamate, a suitable polymerization solvent and an alcohol, characterized by high molecular weight and concentration and low viscosity; and processes for their preparation.

---

This invention relates to poly-γ-substituted glutamate solutions containing alcohols. More particularly, the present invention relates to poly-γ-substituted glutamate solutions containing alcohols obtained by polymerizing one or more N-carboxy anhydrides of γ-substituted glutamates in the presence of a suitable polymerization solvent and characterized by the presence of a primary or secondary alcohol. These solutions are further characterized by high molecular weight and concentration coupled with low viscosity and high stability. Particularly useful are the N-carboxy anhydrides of γ-esters of glutamic acid represented by the general formulae:

(1) 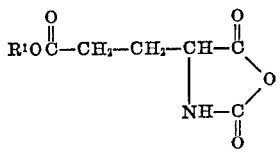

or (2) 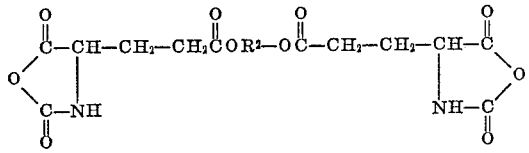

wherein $R^1$ represents a monovalent hydrocarbon group having 1 to 10 carbon atoms and $R^2$ represents a divalent hydrocarbon group having 1 to 10 carbon atoms. The hydrocarbon groups are selected from saturated or unsaturated aliphatic, alicyclic or aromatic hydrocarbon groups (including aliphatic groups containing aromatic groups and aromatic group containing aliphatic groups) such as an alkyl, alkylene, cycloalkyl, cycloalkylene or aryl groups. The groups $R^1$ and $R^2$ may also bear inert substituents, typified by 1 to 3 halogen atoms, nitro groups or alkoxy groups. These compounds will hereinafter be referred to as "GNCA." GNCA is the main reaction component, and one or more halogenated hydrocarbons are employed as the principal polymerization solvent. In the practice of this invention, primary or secondary alcohols are also added to form the desired polymer solutions. The alcohols can be added before the polymerization, in the course of the polymerization, or after the polymerization. This invention also relates to processes for preparing these compositions.

Solutions of polyamino acids have been used in the preparation of artificial leather and synthetic fibers by known techniques. They have also been mixed or reacted with other polymers and utilized as surface-treating agents for various materials. It is desirable in carrying out such operations industrially that the solution viscosity of the polyamino acid solution be low and remain in a definite range even though its numerical value somewhat depends upon the processing method. The viscosity characteristics should also be stable, i.e. they should not exhibit large changes in viscosity after varying periods of time. However, the poly-γ-substituted glutamate solutions generally obtained by polymerization of GNCA in halogenated solvents without adding alcohols have a relatively high viscosity for any given molecular weight, and the solution viscosity varies greatly with a lapse of time. Usually, the solution viscosity increases and sometimes this increase results in the solution becoming gelatinized. Once a poly-γ-substituted glutamate becomes gelatinized, it is very difficult to return the resulting gel to a fluid state. Therefore, it is almost impossible to use such a poly-γ-substituted glutamate solution for producing films, leathers, fibers, or the like, once gelatinization has occurred. When a poly-γ-substituted glutamate solution having low viscosity is desired, such solutions have been heretofore obtained by increasing the amount of polymerization initiator in order to lower the molecular weight or by adding a solvent to lower the polymer concentration. Accordingly, it has been heretofore very difficult to obtain a poly-γ-substituted glutamate solution having high molecular weight and high concentration as well as low viscosity.

Heretofore, it has been well-known that when alcohols are added to poly-γ-substituted glutamate solutions, the poly-γ-substituted glutamate precipitates. Therefore, it would have been expected that the addition of alcohols to the polymerization solvent in the present invention would not result in the formation of a uniform stable poly-γ-substituted glutamate solution. However, as a result of various studies on the addition of alcohols, the inventors have found that a polyglutamic acid derivative solution having high molecular weight and high concentration as well as low viscosity can be obtained by adding suitable alcohols to the solution before, in the course of, or after the polymerization of the GNCA in a suitable solvent. Further, the inventors have found that the polyglutamic acid γ-ester derivative solutions of the present invention show little change in viscosity with a lapse of time.

Now, the present invention will be explained in detail below.

The desired poly-γ-substituted glutamate solution can be obtained by adding a predetermined amount of one or more primary or secondary alcohols to the solution before or in the course of or after the polymerization when one or more GNCA are polymerized in the presence of a polymerization initiator utilizing one or more halogenated hydrocarbons as a polymerization solvent. Generally, when alcohols are added to a solution in the course of polymerization or after polymerization, there is a tendency for the viscosity of the resulting poly-γ-substituted glutamate solution to be slightly higher, but changes in viscosity with the lapse of time do not occur nor do they occur when the alcohols are added before polymerization.

Any optically active or inactive γ-ester of glutamic acid can be used in the present invention as the starting material of GNCA and any of the hydrocarbon groups defined by the general formulae can be used as the ester group at the γ position. Suitable hydrocarbon groups include alkyl groups such as methyl, ethyl, (i- or n-) propyl, (i-, n-, sec- or tert-) butyl, pentyl (and its isomers), hexyl (and its isomers), nonyl (and its isomers), decyl (and its isomers) and the like; alkylene groups such as ethylene, trimethylene, tetramethylene, hexamethylene, and the like; cycloalkyl and cycloalkylene groups such as cyclobutyl, cyclopentyl, cyclohexyl, cycloheptyl, cyclopentylmethyl, 1,4-di-methylenecyclohexane and the like; and aryl groups such as p-phenylene, benzyl, phenylethyl, phenyl, and the like. The hydrocarbon groups can also contain inert substituents such as from 1 to 3 halogen atoms, nitro or alkoxy groups as substituents.

The halogenated hydrocarbons useful in the present invention are preferably halogenated aliphatic hydrocarbons including chloroform, dichloromethane, 1,2-dichloroethane, 1,1-dichloroethane, 1,2-dichloroethylene, 1,1,1-trichloroethane, 1,1,2-trichloroethane, trichloroethylene, tetrachloroethylene, 1,1,2,2-tetrachloroethane, 1,1,1,2-tetrachloroethane, pentachloroethane, 1,2-dichloropropane, 2,2-dichloropropane, 1,3-dichloropropane, 1,2,3-trichloropropane, dibromomethane, 1-bromo-2-chloroethane, 1,1-dibromoethane, 1,2-dibromoethane, 1-bromo-3-chloropropane, isobutylene bromide, bromoform, and the like.

The alcohols useful in the present invention are represented by the following general formulae:

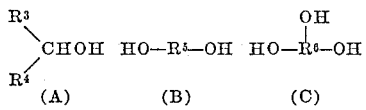

(A)　　(B)　　(C)

wherein $R^3$ and $R^4$ are the same or different and are hydrogen atoms or monovalent hydrocarbon residues such as alkyl or aryl containing from 1 to 10 carbon atoms, and $R^3$ and $R^4$ may also be part of a cycloalkyl ring, $R^5$ is a divalent hydrocarbon residue containing from 1 to 10 carbon atoms and $R^6$ is a trivalent hydrocarbon residue containing from 1 to 10 carbon atoms. These hydrocarbon residues are saturated or unsaturated aliphatic, alicyclic or aromatic hydrocarbon residues (including aliphatic groups containing aromatic residues and aromatic groups containing aliphatic residues); and the hydrocarbon residues include those bearing inert substituents such as halogen atoms or cyano, nitro or alkoxy groups and those having an ether bond. Typical alcohols include alkyl alcohols such as methyl alcohol, ethyl alcohol, (i- or n-) propyl alcohol, (i-, n- or sec-) butyl alcohol, pentyl alcohols (including isomers), hexyl alcohols (including isomers), octyl alcohols (including isomers), decyl alcohols (including isomers) and the like; alkylene glycols such as ethylene glycol, propylene glycol, butylene glycol; glycerine and the like; the ethylene glycol alkylethers, sold under the trademark "Cellosolve" such as the methyl, ethyl, propyl (and its isomers) and butyl (and its isomers) ethers; cycloalkyl alcohols such as cyclohexyl alcohol, cyclopentyl alcohol, cyclohexylmethyl alcohol; ethylene chlorohydrin, β-nitroethyl alcohol; β-cyanoethyl alcohol; benzyl alcohol; furfuryl alcohol; tetrahydrofurfuryl alcohol; and the like.

The ratio of the mixture of the polymerization solvent containing the halogenated aliphatic hydrocarbon and the alcohols may be varied according to the desired solution viscosity and the molecular weight of the polyamino acid. A ratio, by volume, of halogenated hydrocarbon to alcohol in the range of from about 99.99:0.01 to 30:70 is usually suitable. There is no restriction as to the amount of polymerization solvent that may be used, as long as a sufficient amount is utilized to form a good polymerization system. The polymerization solvent is usually used in an amount such that it will contain 1–30% solid components.

In carrying out the present invention, any of the well-known polymerization initiators useful in the polymerization of N-carboxy anhydrides of amino acids, for example, organic bases, organometallic compounds, and the like, are suitable. Typical polymerization initiators are, for example, trialkylamines such as trimethylamine, triethylamine, (n- or iso) tripropylamine, tributylamine (and its isomers), trihexylamine (and its isomers) tricyclohexylamine; 4,4',4''-trisdimethylaminotriphenylmethane; dialkylamines such as diethylamine, dipropylamine (and its isomers), dibutylamine (and its isomers), dihexylamine (and its isomers), dicyclohexylamine; alkylamines such as ethylamine, propylamine (and its isomers), butylamine (and its isomers), hexylamine (and its isomers), cyclohexylamine; morpholine; ethanolamine, diethanolamine, triethanolamine; N-lower alkylmorpholines; N-lower alkyl-2-pyrrolidones; 2-pyrrolidone sodium salts, lower alkyllithiums; di-lower alkyl zincs; mono-lower alkyl zincs; lower alkoxides; metal lower alkoxides; and the like, wherein said lower alkyls represent alkyl groups having 1 to 6 carbon atoms such as methyl, ethyl, propyl, butyl and hexyl. It is desirable to determine the amount of polymerization initiator to be used in view of the type of polymerization initiator, the halogenated aliphatic hydrocarbon, the alcohol and the mixing ratio of these solvents, and further, the desired molecular weight and viscosity of the desired solution. The polymerization initiator is usually used in a molar amount of 0.001 to 1.0 times as much as that of the GNCA.

When a polymerization solution having a particularly high concentration is desired, it is preferable to heat the system at or near the boiling point of the polymerization solvent in order to promote the polymerization. However, poly-γ-substituted glutamate solutions having high concentrations as well as low solution viscosities can be obtained by effecting the polymerization at normal room temperatures or even lower temperatures such as down to about −20° C. The rate of polymerization depends upon the type and amount of polymerization initiator utilized, but it is usually possible to complete the polymerization within a period of about a few hours. Further, the solution viscosity and the molecular weight of the polyamino acid solution to be obtained can be controlled by controlling the amount of water in the polymerization reaction system and by controlling the polymerization temperature. Furthermore, the values of the molecular weight and solution viscosity to be obtained depend on the quality of the GNCA utilized.

According to conventional, well-known polymerization methods, the ratio of solution viscosity to molecular weight is high. For example, when 20.0 g. of the NSA of γ-methyl-L-glutamic acid ester are admixed with 0.22 g. of triethylamine in 125 ml. of 1,2-dichloroethane containing 50 p.p.m. of water and polymerized at 18–20° C., the viscosity of the thus obtained 10% poly-γ-methyl-L-glutamate solution is 80,000 centipoises (hereinafter referred to as "cps.") and its molecular weight of the thus obtained poly-γ-methyl-L-glutamate is 180,000 (computed from Doty's viscosity formula, using an intrinsic viscosity measured beforehand). One embodiment of the present invention is shown as follows: polymerizations are performed varying the mixing ratios (by volume) of 1,2-dichloroethane to i-propyl alcohol in 125 ml. of the polymerization solvents. The relation between the solution viscosity and the molecular weight is shown in the following table (the viscosity was determined by a synchronous motor-type rotation viscosimeter).

| Polymerization temperature | i-Propyl alcohol content, percent | Viscosity (×10,000 cps.) immediately after preparation | Viscosity (×10,000 cps.) after 10 days | Molecular weight (×10,000) |
|---|---|---|---|---|
| 20° C | 5 | 5.3 | 4.5 | 17.6 |
| 20° C | 10 | 0.90 | 0.68 | 16.0 |
| 0° C | 5 | 0.18 | 0.20 | 11.8 |
| 0° C | 10 | 0.16 | 0.16 | 8.5 |

The poly-γ-substituted glutamate solutions having high molecular weight and high concentration and low viscosity obtained according to the present invention remain stable for long periods of time and show suitable properties for use in preparing moldings.

Further, the poly-γ-substituted glutamate solutions obtained according to the present invention can not only be used directly for preparing moldings, but they can also be mixed with various well-known compounds in order to improve the physical properties of the poly-γ-substituted glutamate, such as other polyamino acids, cellulose acetate, vinyl polymers, polyurethanes, etc.

In the present invention, the heretofore well-known other polymerization solvents, for example, dimethyl sulfoxide, dimethyl fromamide, dimethyl acetamide, and the like may be added to the halogenated hydrocarbons to form polymerization solvent mixtures.

The examples showing the embodiments of the present invention will be given below, but the present invention will not be limited thereto. In the present invention a synchronous motor-type rotation viscosimeter was used to determine the viscosity of the solutions.

EXAMPLE 1

Triethylamine is added as a polymerization initiator in the amount of 0.02 mole per mole of N-carboxy anhydride to 150 ml. of a solvent mixture consisting of 1,2-dichloroethane and isopropanol in the ratio (by volume) of 90:10, and the resulting mixture is stirred well. 28.5 g. of the N-carboxy anhydride of γ-methyl-L-glutamate are added thereto with stirring and polymerized at 20° C. for 5 hours. A portion of the polymerized solution is added dropwise to a large volume of methanol in order to precipitate a sample of the polymer. The precipitated polymer is dried, and its intrinsic viscosity in dichloroacetic acid is found to be 1.50 (20° C.). The viscosity of the obtained poly-γ-methyl-L-glutamate solution in the 1,2-dichloroethane/isopropanol solution is 7,800 cps. at 20° C. The change in the solution viscosity with time is given below:

| | Cps. |
|---|---|
| Immediately after preparation | 7,800 |
| After one month | 6,400 |
| After three months | 6,100 |
| After six months | 6,000 |

The viscosity of a polymer solution obtained by carrying out the polymerization under the same conditions as above, but using only 1,2-dichloroethane as a polymerization solvent is 85,000 cps. Further, the intrinsic viscosity thereof in a dichloroacetic acid solution is 1.53 (20° C.).

EXAMPLE 2

The sodium salt of 2-pyrrolidone is added as a polymerization initiator in the amount of 0.01 mole per mole of N-carboxy anhydride to 150 ml. of a solvent mixture consisting of 1,2-dichloroethane and n-butanol in the ratio (by volume) of 97:3, and the resulting mixture is stirred well. 30.3 g. of the N-carboxy anhydride of γ-ethyl-D-glutamate are added thereto with stirring, and the mixture is polymerized at 40° C. for 6 hours. A portion of the solution is added dropwise to a large volume of methanol in order to precipitate a sample of polymer. The precipitated polymer is dried and its intrinsic, viscosity thereof is measured in dichloroacetic acid solution and is found to be 1.43 (20° C.). The viscosity of the obtained poly-γ-ethyl-D-glutamate solution in the 1,2-dichloroethane/n-butanol is 18,000 cps. at 20° C. The change in the solution viscosity with time is given below:

| | Cps. |
|---|---|
| Immediately after preparation | 18,000 |
| After one month | 18,000 |
| After three months | 18,200 |
| After six months | 18,200 |

The viscosity of a polymer solution obtained by carrying out the polymerization under the same conditions as above, but using only 1,2-dichloroethane as a polymerization solvent, is 158,000 cps. Further, the intrinsic viscosity thereof in a dichloroacetic acid solution is 1.40 (20° C.).

EXAMPLE 3

Tri-n-butylamine is added as a polymerization initiator in the amount of 0.02 moles per mole of N-carboxy anhydride (NCA) to 150 ml. of a solvent mixture consisting of chloroform and sec-butyl alcohol in the ratio (by volume) of 85:15, and the mixture is stirred well. 35.0 g. of the NCA of γ-benzyl-L-glutamate are added thereto and the mixture is polymerized at 20° C. for 5 hours. A portion of the solution is added dropwise to a large volume of methanol in order to precipitate a sample of polymer. The precipitated polymer is dried and its intrinsic viscosity thereof is measured in dichloroacetic acid solution and is found to be 1.73 (20° C.). The viscosity of the obtained poly-γ-benzyl-L-glutamate solution in the chloroform/sec-butyl alcohol solution is 3,300 cps. at 20° C. The viscosity of the solution one month after preparation is found to be 2,600 cps., and almost no change in the viscosity is observed with time.

EXAMPLE 4

Triethylamine is added as a polymerization initiator in the amount of 0.02 mole per mole of NCA to 150 ml. of a solvent mixture consisting of 1,2-dichloroethane and ethanol in the ratio (by volume) of 99.9:0.1, and the resulting mixture is stirred well. 28.5 g. of the NCA of γ-methyl-L-glutamate are added thereto and the mixture is polymerized at 20° C. for 5 hours. A portion of the solution is added dropwise to a large volume of methanol in order to precipitate a sample of the polymer. The precipitated polymer is dried and its intrinsic viscosity thereof in dichloroacetic acid is found to be 1.2 (20° C.). The viscosity of the obtained poly-γ-methyl-L-glutamate solution in the 1,2-dichloroethane/ethanol solution is 4,090 cps. at 20° C. The viscosity of the solution one month after preparation is found to be 4,050 cps. and almost no change in the viscosity is observed with time.

EXAMPLE 5

Triethylamine is added as a polymerization initiator in the amount of 0.033 mole per mole of NCA to 150 ml. of a solvent mixture consisting of trichloroethylene and n-octanol in the ratio (by volume) of 99.7:0.3, and the resulting mixture is stirred well. 29.0 g. of the NCA of $O^1$, $O^2$-di(γ-glutamyl)-ethyleneglycol are added thereto with stirring and the mixture is polymerized at 20° C. for 6 hours. A portion of the solution is added dropwise to a large volume of methanol in order to precipitate a sample of the polymer. The precipitated polymer is dried and its intrinsic viscosity thereof is measured in dichloroacetic acid solution and is found to be 1.5 (20° C.). The viscosity of the obtained $O^1,O^2$-di(γ-glutamyl)-ethyleneglycol solution in the trichloroethylene/n-octanol solution is found to be 7,500 cps. at 20° C. The viscosity of the solution one month after preparation is found to be 7,480 cps. and the viscosity three months after preparation is found to be 7,530 cps. Almost no change in the viscosity is observed with time.

EXAMPLE 6

Tri-n-butylamine is added as a polymerization initiator in the amount of 0.025 mole per mole of NCA to 150 ml. of a solvent mixture consisting of 1,2-dichloroethane and ethylene glycol monoethylether sold under the trademark ethyl "Cellosolve" in the ratio (by volume) of 99.9:0.1, and the resulting mixture is stirred well. 30.0 g. of the NCA of γ-cyclohexyl-L-glutamate are added thereto with stirring and polymerized at 15° C. for 10 hours. A portion of the solution is added dropwise to a large volume of methanol in order to precipitate a sample of the polymer. The precipitated polymer is dried and its intrinsic viscosity thereof is measured in dichloroacetic acid solution and is found to be 1.45 (20° C.). The viscosity of the obtained poly-γ-cyclohexyl-L-glutamate solution in the 1,2-dichloroethane/ethylene glycol monoethylether solution is 8,660 cps. at 20° C. The change in the solution viscosity with time is given below:

| | Cps. |
|---|---|
| Immerdiately after preparation | 8,660 |
| After one month | 8,600 |
| After three months | 8,610 |
| After six months | 8,650 |

The viscosity of a polymer solution obtained by carrying out the polymerization under the same conditions as above, but using only 1,2-dichloroethane as a polymerization solvent is 66,000 cps.

EXAMPLES 7–18

Polymer solutions having constant solution viscosities are obtained by carrying out the polymerization process according to the procedures of Example 1, using polymerization solvents, polymerization initiators and NCA's as shown in the following table. The solution viscosities show almost no change with time.

ture is stirred for an additional 3 hours. A portion of the solution is added dropwise to a large volume of methanol in order to precipitate a sample of the polymer. The precipitated polymer is dried and its intrinsic viscosity is measured in dichloroacetic acid solution and is found to be 1.81 (20° C.). The viscosity of the obtained poly-γ-methyl-L-glutamate solution in 1,2-dichloroethane/n-propanol solution is 20,000 cps. at 20° C. The viscosity of the solution one month after preparation is found to be 20,250 cps. and almost no change in the viscosity is observed with time.

| | Polymerization solvent | | | Polymerization initiator | | NCA | | | |
|---|---|---|---|---|---|---|---|---|---|
| Example | Kind | Mixing ratio, percent | Amount used, ml. | Kind | Molar amount used (initiator NCA) | Kind | Amount used, g. | Apparent solution viscosity 20° C. [cps.] | Intrinsic viscosity 20° C. [η] |
| 7 | 1,2-dichloroethane<br>Benzyl alcohol | 99.9<br>0.1 | 150 | Triethylamine | 0.02 | NCA of γ-methyl-L-glutamate. | 29.0 | 370 | 1.0 |
| 8 | 1,1,2,2-tetrachloroethane.<br>β-Chloroethyl alcohol. | 99.9<br>0.1 | 150 | Dipropylamine | 0.02 | NCA of γ-(β-phenylethyl)-L-glutamate. | 35.0 | 4,500 | 1.3 |
| 9 | 1,3-dichloropropane.<br>Methanol | 99.8<br>0.2 | 200 | Sodium salt of 2-pyrrolidone. | 0.01 | NCA of γ-(2'-chloroethyl)-L-glutamate. | 33.0 | 1,000 | 1.5 |
| 10 | 1,2-dichloropropane.<br>Ethylenebromohydrin. | 99.9<br>0.1 | 150 | Triethanolamine | 0.02 | NCA of γ-cyclopentylmethyl-L-glutamate. | 31.5 | 6,500 | 1.5 |
| 11 | Trichloroethylene<br>Furfuryl alcohol | 99.97<br>0.03 | 150 | di-n-Butylamine | 0.02 | NCA of γ-cyclohexyl-L-glutamate. | 35.0 | + 4,000 | 1.3 |
| 12 | 1-bromo-2-chloroethane.<br>Allyl alcohol | 99.9<br>0.1 | 150 | Triethylamine | 0.02 | NCA of O¹,O²-di-(γ-D-glutamyl) tetramethylene glycol. | 33.5 | 4,200 | 1.3 |
| 13 | 1,2-dichloroethane<br>β-Cyanoethyl alcohol. | 99.7<br>0.3 | 166 | 4,4'4''-tris-dimethyl-aminotriphenyl-methane. | 0.017 | NCA of O¹,O²-di-(γ-L-glutamyl) cyclohexylene glycol. | 30.3 | 1,200 | 0.9 |
| 14 | 1,2-dichloroethylene.<br>1,1,2,2-tetrachloroethane.<br>Methyl phenyl carbinol. | 95.0<br>4.5<br>0.5 | 150 | N-alkylmorpholine | 0.025 | NCA of O¹,O²-di-(γ-D-glutamyl)-1,4-dimethylene-cyclohexane glycol. | 34.0 | 450 | 1.4 |
| 15 | 1,2-dichloroethane<br>N,N-dimethyl formamide.<br>Glycerine | 94.9<br>5.0<br>0.05 | 150 | Triethylamine | 0.02 | NCA of γ-methyl-L-glutamate, NCA of methionine-20:1. | 29.0 | 8,500 | 1.4 |
| 16 | Chloroform<br>N-methyl-2-pyrrolidone.<br>Ethyleneglycol | 90.0<br>9.8<br>0.2 | 150 | Tri-n-butylamine | 0.025 | NCA of γ-benzyl-L-glutamate, NCA of γ-methyl-L-glutamate-1:1. | 31.0 | 1,500 | 1.2 |
| 17 | 1,2-dichloroethane<br>Tetrahydrofurfuryl alcohol. | 99.9<br>0.1 | 180 | Sodium methoxide | 0.01 | NCA of γ-n-butyl-D-glutamate. | 35.0 | 5,400 | 1.3 |
| 18 | 1,2-dichloroethane<br>3-chloro-1,2-propanediol. | 99.9<br>0.1 | 150 | Triethylamine | 0.02 | NCA of γ-ethyl-L-glutamate. | 30.0 | 1,800 | 1.3 |

EXAMPLE 19

Triethylamine is added as a polymerization initiator to 125 ml. of 1,2-dichloroethane in the amount of 0.02 mole per mole of NCA, and the resulting mixture is stirred well. 5.0 g. of the NCA of γ-methyl-L-glutamate are added thereto, and the mixture is polymerized at 20° C. for 20 minutes. Then, isopropanol is added and after stirring well. 15 g. of the remaining NCA of γ-methyl-L-glutamate is added and the mixture is further polymerized for an additional 5 hours. A portion of the solution is added dropwise to a large volume of methanol in order to precipitate a sample of the polymer. The precipitated polymer is dried and its intrinsic viscosity in dichloroacetic acid is found to be 1.5 (20° C.). The viscosity of the obtained poly-γ-methyl-L-glutamate solution in the 1,2-dichloroethane/isopropanol solution is 15,000 cps. at 20° C. The viscosity of the solution one month after preparation is found to be 15,400 cps. and almost no change in the viscosity is observed with time.

EXAMPLE 20

Triethylamine is added as a polymerization initiator to 125 ml. of 1,2-dichloroethane in the amount of 0.02 mole per mole of NCA and the mixture is stirred well. 20.0 g. of the NCA of γ-methyl-L-glutamate are added thereto and the mixture is polymerized at 20° C. for 5 hours. Then, n-propanol is added thereto, and the resulting mix-

EXAMPLE 21

Triethylamine is added as a polymerization initiator to 125 ml. of 1,2-dichloroethane in the amount of 0.02 mole per mole of NCA and the mixture is stirred well. 20.0 g. of the NCA of γ-methyl-L-glutamate are added thereto and the mixture is polymerized at 20° C. for 30 minutes and then, ethyleneglycol mono-n-butylether sold under the trademark n-butyl "Cellosolve" is added thereto, and the resulting mixture is stirred for an additional 5 hours. A portion of the solution is added dropwise to a large volume of methanol in order to precipitate a sample of the polymer. The precipitated polymer is dried and its intrinsic viscosity thereof in dichloroacetic acid is found to be 1.4 (20° C.). The viscosity of the obtained poly-γ-methyl-L-glutamate solution in the 1,2-dichloroethane/ethyleneglycol mono-n-butylether solution is 30,130 cps. at 20° C., and almost no further change in the viscosity is observed with time.

EXAMPLE 22

Sodium 2-pyrrolidone is added as a polymerization initiator to 125 ml. of 1,2-dichloroethane in the amount of 0.01 mole per mole of NCA and the mixture is stirred well. 5.0 g. of the NCA of γ-methyl-L-glutamate is added thereto and the mixture is polymerized at 20° C. for 20 minutes. Then isopropanol is added thereto and after stirring 15.0 g. of the remaining NCA of γ-methyl-L-glutamate are added thereto and the mixture is polymerized for an additional 5 hours. A portion of the solution is added dropwise to a large volume of methanol in order to precipitate a sample of the polymer. The precipitated polymer is dried and its intrinsic viscosity thereof is measured in dichloroacetic acid solution and is found to be 1.41 (20° C.). The viscosity of the obtained poly-γ-methyl-L-glutamate solution in the 1,2-dichloroethane/isopropanol solution is 58,000 cps. at 20° C.

The viscosity of a polymer solution obtained by carrying out the polymerization under the same conditions as above, but without adding the isopropanol in the course of the polymerization is 560,000 cps. Further, when a portion of this polymer solution is added dropwise to a large volume of methanol in order to precipitate a sample of the polymer and the precipitated polymer is dried, the intrinsic viscosity as is measured in dichloroacetic acid solution is found to be 1.43 (20° C.).

The viscosity of the polymer solution containing isopropanol one month after preparation is 55,300 cps. and almost no change in the viscosity is observed with time.

EXAMPLES 23–25

Polymerizations are carried out according to the procedures of Example 20, except that the n-propanol of Example 20 is replaced with the following alcohols, and the results obtained are shown in the following table.

| Ex. | Alcohols added | | Apparent solution viscosity immediately after the preparation, cps. (20° C.) | Intrinsic viscosity immediately after the preparation, η (20° C.) | Apparent solution viscosity one month after the preparation, cps. (20° C.) |
| --- | --- | --- | --- | --- | --- |
| | Kind | Amount added, percent | | | |
| 23 | Methyl alcohol | 10 | 10,400 | 1.81 | 10,500 |
| 24 | Ethyl alcohol | 10 | 17,000 | 1.81 | 17,800 |
| 25 | Isopropyl alcohol | 10 | 25,000 | 1.83 | 25,500 |
| 26 | No addition | | 35,000 | 1.85 | 45,000 |

Almost no change in the solution viscosities are recognized one month after preparation or with further lapses of time.

What is claimed is:

1. Poly-γ-substituted glutamate solution compositions comprising (1) at least one polyglutamic acid γ-ester which is the polymerization product of an N-carboxy anhydride of a γ-substituted glutamate of the general formulae:

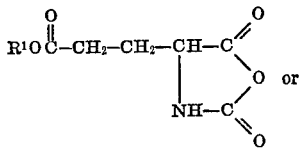

or

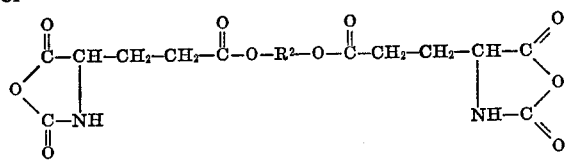

wherein $R^1$ is a monovalent alkyl, alkylene, cycloalkyl, cycloalkylene or aryl hydrocarbon group containing from 1 to 10 carbon atoms and $R^2$ is a divalent alkyl, alkylene, cycloalkylene or aryl hydrocarbon group containing from 1 to 10 carbon atoms, (2) at least one aliphatic halogenated hydrocarbon containing from 1 to 3 carbon atoms, and (3) at least one alcohol which is of the general formulae:

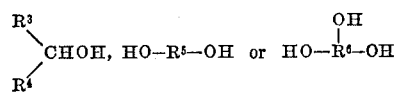

wherein $R^3$ and $R^4$ are the same or different and are hydrogen or monovalent alkyl containing from 1 to 10 carbon atoms or aryl, $R^5$ is divalent alkylene groups containing from 1 to 10 carbon atoms, and $R^6$ is a trivalent aliphatic hydrocarbon group containing from 1 to 10 carbon atoms; and wherein the ratio of aliphatic halogenated hydrocarbon solvent to alcohol being in the range of about 99.99:0.01 to 30.70.

2. The composition of claim 1 wherein said alcohol is an alkyl alcohol containing from 1 to 10 carbon atoms.

3. The composition of claim 1, wherein the halogenated hydrocarbon is 1,2-dichloroethane.

4. The composition of claim 1 wherein $R^1$ and $R^2$ are alkyl groups containing from 1 to 10 carbon atoms.

5. The composition of claim 1, wherein the N-carboxy anhydride of a γ-substituted glutamate comprises the N-carboxy anhydride of γ-methyl-L-glutamate.

6. The composition of claim 1, wherein the N-carboxy anhydride of a γ-substituted glutamate comprises the N-carboxy anhydride of γ-ethyl-D-glutamate.

7. The composition of claim 1, wherein the N-carboxy anhydride of a γ-substituted glutamate comprises the N-carboxy anhydride of γ-benzyl-L-glutamate.

8. The composition of claim 1, wherein the N-carboxy anhydride of a γ-substituted glutamate comprises the N-carboxy anhydride of $O^1,O^2$-di(γ-glutamyl) ethylene glycol.

9. The composition of claim 1, wherein the N-carboxy anhydride of a γ-substituted glutamate comprises the N-carboxy anhydride of γ-cyclohexyl-L-glutamate.

10. The composition of claim 1, wherein the N-carboxy anhydride of a γ-substituted glutamate comprises the N-carboxy anhydride of γ-phenylethyl-L-glutamate.

11. The composition of claim 1, wherein the N-carboxy anhydride of a γ-substituted glutamate comprises the N-carboxy anhydride of γ-(2'-chloroethyl)-L-glutamate.

12. The composition of claim 1, wherein the N-carboxy anhydride of a γ-substituted glutamate comprises the N-carboxy anhydride of γ-cyclopentylmethyl-L-glutamate.

13. The composition of claim 1, wherein the N-carboxy anhydride of a γ-substituted glutamate comprises the N-carboxy anhydride of $O^1,O^2$-di(γ-D-glutamyl) tetramethylene glycol.

14. The composition of claim 1, wherein the N-carboxy anhydride of a γ-substituted glutamate comprises the N-carboxy anhydride of $O^1,O^2$-di(γ-L-glutamyl)cyclohexylene glycol.

15. The composition of claim 1, wherein the N-carboxy anhydride of a γ-substituted glutamate comprises the N-carboxy anhydride of $O^1,O^2$-di(γ-D-glutamyl)-1,4-dimethylene-cyclohexane glycol.

16. The composition of claim 1, wherein the N-carboxy anhydride of a γ-substituted glutamate comprises a mixture of the N-carboxy anhydride of γ-methyl-L-glutamate and the N-carboxy anhydride of methionine.

17. The composition of claim 1, wherein the N-carboxy anhydride of a γ-substituted glutamate comprises a mixture of the N-carboxy anhydride of γ-benzyl-L-glutamate and the N-carboxy anhydride of γ-methyl-L-glutamate.

18. The composition of claim 1, wherein the N-carboxy anhydride of a γ-substituted glutamate comprises the N-carboxy anhydride of n-butyl-D-glutamate.

References Cited

UNITED STATES PATENTS

| | | | |
|---|---|---|---|
| 3,089,749 | 5/1963 | Ballard | 260—78 A X |
| 3,369,026 | 2/1968 | Twatsuki et al. | 260—78 A X |

FOREIGN PATENTS

| | | | |
|---|---|---|---|
| 996,760 | 6/1965 | Great Britain | 260—78 A |
| 12,517 | 7/1966 | Japan | 260—78 A |
| 13,992 | 6/1968 | Japan | 260—78 A |

LEWIS T. JACOBS, Primary Examiner

U.S. Cl. X.R.

260—33.8 R